United States Patent
Naik et al.

(10) Patent No.: US 12,238,568 B2
(45) Date of Patent: Feb. 25, 2025

(54) SYSTEM AND METHOD FOR PROVISIONING A PORTABLE VIRTUAL RAN ACROSS A PLURALITY OF RAN HARDWARE PLATFORMS

(71) Applicant: TEJAS NETWORKS LIMITED, Bangaluru (IN)

(72) Inventors: Parag Naik, Bangalore (IN); Anindya Saha, Bangalore (IN); Makarand Kulkami, Bangalore (IN); Hemant Mallapur, Bangalore (IN); Susmit Kumar Datta, Bangalore (IN); Sandeep Pendharkar, Bangalore (IN); Venugopal Kolathur, Bangalore (IN); Sudarshan V, Bangalore (IN)

(73) Assignee: TEJAS NETWORKS LIMITED, Bengalaru (IN)

( * ) Notice: Subject to any disclaimer, the term of this patent is extended or adjusted under 35 U.S.C. 154(b) by 144 days.

(21) Appl. No.: 17/778,841

(22) PCT Filed: May 16, 2021

(86) PCT No.: PCT/IN2021/050469
§ 371 (c)(1),
(2) Date: May 22, 2022

(87) PCT Pub. No.: WO2021/234728
PCT Pub. Date: Nov. 25, 2021

(65) Prior Publication Data
US 2023/0057887 A1    Feb. 23, 2023

(30) Foreign Application Priority Data
May 16, 2020 (IN) .............................. 202041020746

(51) Int. Cl.
H04W 28/02 (2009.01)
H04L 41/0803 (2022.01)
H04L 41/0895 (2022.01)

(52) U.S. Cl.
CPC ..... *H04W 28/0263* (2013.01); *H04L 41/0803* (2013.01); *H04L 41/0895* (2022.05)

(58) Field of Classification Search
CPC ........... H04W 28/0263; H04L 41/0895; H04L 41/0803
See application file for complete search history.

(56) References Cited

U.S. PATENT DOCUMENTS

2018/0176143 A1\* 6/2018 Cui .................... H04L 49/70
2018/0376338 A1\* 12/2018 Ashrafi ............... H04L 41/0816
(Continued)

*Primary Examiner* — Won Tae C Kim
(74) *Attorney, Agent, or Firm* — HSML P.C.

(57) ABSTRACT

A virtual Radio Access Network (vRAN) system (300) for provisioning a virtual Radio Access Network (RAN) that is portable across one or more RAN hardware platforms is provided. The virtual Radio Access Network (vRAN) system (300) includes a waveform development kit (WDK) (302), and a waveform execution environment (304). The waveform development kit (302) defines at least one portable Radio Access Network (RAN) application into a form that is instantiated on a RAN hardware (326). The waveform execution environment (304) (i) monitors real-time schedulable resources in real-time, and (ii) collects one or more statistics and monitors the one or more statistics for network automation. The waveform execution environment (304) includes a RAN hypervisor (314) that virtualizes at least one attribute of a spectral resource required to provision the RAN that is portable across at least one hardware platform of the one or more RAN hardware platforms in the RAN hardware.

20 Claims, 12 Drawing Sheets

(56) References Cited

U.S. PATENT DOCUMENTS

2020/0028772 A1* 1/2020 Laslau ................ H04L 43/0817
2020/0145299 A1* 5/2020 Do ...................... H04L 41/0816

* cited by examiner

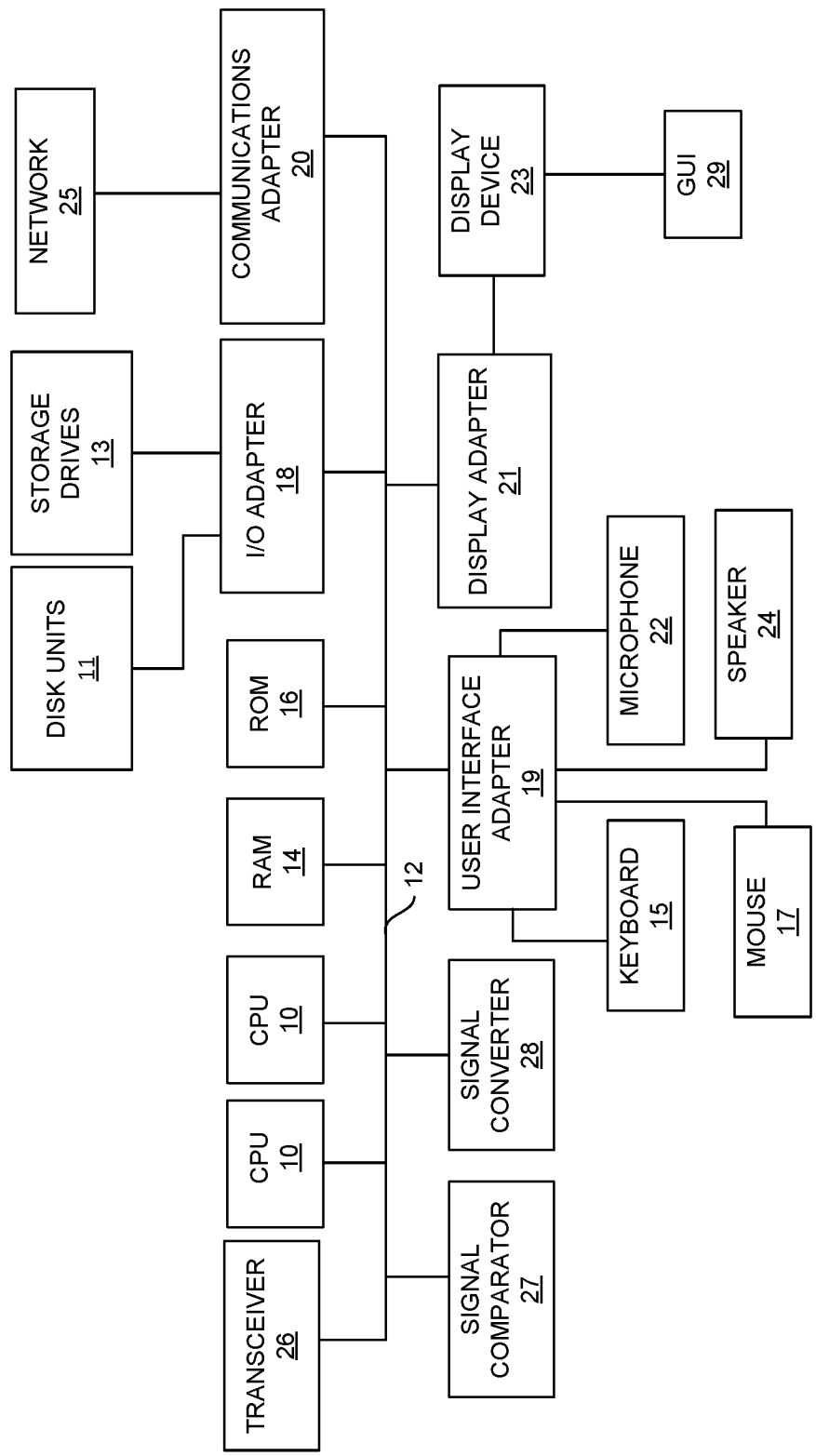

SYSTEM AND METHOD FOR PROVISIONING A PORTABLE VIRTUAL RAN ACROSS A PLURALITY OF RAN HARDWARE PLATFORMS

BACKGROUND

Technical Field

CROSS-REFERENCE TO RELATED APPLICATIONS

This application claims priority to Indian non-provisional patent application no. 202041020746 filed on May 16, 2020, the complete disclosure of which, in their entirety, is herein incorporated by reference.

Technical Field

The embodiments herein generally relate to portable Radio Access Network (RAN) modems and Digital Signal Processing (DSP) applications, and more particularly, to a system and method for provisioning a virtual Radio Access Network (RAN) that is portable across a plurality of RAN hardware platforms.

DESCRIPTION OF THE RELATED ART

Digital Signal Processing or the application of digital computation to signal processing is fundamental to wireless communications. A Digital Signal Processor is a specialized microprocessor chip with its architecture optimized for performing Digital Signal Processing operations. Traditionally, DSP software is designed and developed to be executed on this specialized hardware taking advantage of the special CPU architectures and several hardware accelerators which greatly improve the speed of signal processing applications.

A Radio Access Network (RAN) is a part of a mobile telecommunication system that connects wireless connected devices with a core network. Legacy mobile network infrastructure uses proprietary and bundled configuration-specific network technology that results in lock-in to a specific vendor and results in challenges in managing varied devices in the same network. Radio Access Network (RAN) provides access to the services of core networks over the wireless medium. These services are in turn implemented by one or more types of core elements. Operators have been making efforts to streamline the network by virtualizing the radio access network (RAN) to make a Virtual Radio access network (vRAN). The virtualized RAN or Cloud-RAN runs the baseband functions as VNFs (Virtual Network Functions) at telecommunication data-centers or public data-centers. The vRAN can execute on vendor proprietary appliance base-stations OR as virtualized network function software on virtual machines hosted on standard servers in a pooled manner at a data center. In vRAN, the baseband functions run as virtual machines.

FIG. 1 is a block diagram of a traditional Radio Access Network (RAN) architecture according to a prior art. The traditional RAN includes one or more towers 102A-N, one or more cell site cabinets 104A-N, a backhaul 110, and a core network 112. Each cell site cabinet 104A includes a set of Radio Units (RU) 106A-B and a baseband unit (BBU) 108A. In some embodiments, a RU 106N may be connected at a tower 102N and communicated with a baseband unit (BBU) 108N through a Common Public Radio Interface (CPRI) fiber.

FIG. 2 is an exemplary system diagram of traditional Virtual Radio Access Network (vRAN) architecture according to a prior art. The vRAN includes one or more towers 102A-N a fronthaul 202A, a backhaul 202B, a virtual server 205 that includes one or more virtual base station 206A-N, the core network 112. With reference to the FIG. 1 and FIG. 2, for vRAN, a base station software runs on virtual servers as virtual machines. However, the traditional Virtual Radio Access Network (vRAN) as shown in FIG. 1 and FIG. 2 has several limitations.

In a traditional RAN, the implementation of the baseband unit (BBU) 108A is based on custom ASICs and FPGAs. Whereas in the vRAN, the baseband unit (BBU) 108A is implemented as a software component running on standard servers for example, the virtual server 205. In the vRAN, the baseband unit is communicatively connected to the set of radio units (RU) 106A-B mounted on the one or more towers 102A-N through the fronthaul 202A and to the core network 112 through the backhaul 202B.

Traditional Virtual Radio Access Network (vRAN) implementations use servers implemented using CPU architectures built and optimized for a variety of enterprise IT workloads Using these servers for vRAN implementation leads to over-budgeting of resources to execute vRAN Signal processing-oriented workloads, resulting in much higher cost and power. The traditional Virtual Radio Access Network (vRAN) may also at times rely on Field Programmable Gate Array (FPGA) acceleration, resulting in even high power consumption. Such purpose built vRAN Software is usually not portable across various hardware skews. At times they are not portable across even on homomorphic Instruction Set Architecture (ISA) implementations due to the vendor-specific restrictions In addition, RAN workload is not dynamically shared across the processing elements (PEs) once instantiated.

The traditional Virtual Radio Access Network (vRAN) is not capable of creating a software-based virtual representation, or virtualization of the processing elements optimally, and RAN compute resources tend to be very hardware-specific. Moreover, processing elements themselves are not "Signal aware". This means that they are incapable of being reconfigured dynamically based on signal conditions, and therefore cannot realize substantial savings in power consumption, while not sacrificing performance. Implementation and management of network slices are central to 5G RAN deployments. For effective implementation of slicing, radio resources such as spectrum, interference in a spectrum, and other attributes of the spectrum need to be virtualized jointly with computing resources needed to implement the RANs. Currently RAN containerization is limited to functions that can be completely specified as VNF (Virtual Network Functions). In the case of RAN implementations, custom hardware solutions make containerization difficult if not impossible. Also, RAN orchestration is either absent or limited in functionality.

There are several existing RAN hardware platforms such as FlexRAN® from Intel®, SoC ASIC® based solutions from Marvell®, NXP®, and TI®, and FPGA based solutions from Xilinx® and Altera® that are used in vRANs and RANs deployed in existing telecommunication systems. Each of these has several drawbacks such as a lack of openness, limited scalability, excess power consumption, cumbersome software development, high operating expenses, and no RAN AI acceleration. None of the previously mentioned solutions provide flexibility for independent hardware vendors. In the case of FlexRAN®, its ISA is open but its microarchitecture is closed. similarly, for SoC ASIC® solutions are closed. With respect to scalability, the FlexRAN® solution is suitable only for data center type deployments. The SoC ASIC® based solutions are typically dimensioned for small-cells or macro-cells and are not easily aggregated to scale up or scale-down. The FPGA solutions are scaled up by aggregating more devices but need re-dimensioning and regeneration of FPGA bit-file/netlist compatibles based on the nature of deployment e.g. small-cells or macro-cells.

With respect to power consumption, (i) the FlexRAN® solution is power-hungry. The SoC ASIC® solutions have lower power consumption compared to FlexRAN and FPGA based solutions, but the power consumption cannot scale dynamically based on RAN workloads. With respect to ease of software development, (i) software development for FlexRAN® is cumbersome, platform-dependent, and written using a combination of C and assembly, and further optimized for specific processor families, which makes it difficult to port these implementations across platforms. For SoC ASIC®, software development is cumbersome and mostly closed with very specific primitives based on the SoC architecture. It is not friendly to be written by a generic user and not portable. For FPGA based solutions, software development is cumbersome and mostly closed with very specific primitives based on the selected FPGA Platform, not friendly to be written by a generic user, and portable only at a Register Transfer Level. Further, platforms like FlexRAN® have very high operational expenses.

Accordingly, there is a need to mitigate and/or overcome drawbacks associated with current systems and methods for the design and development of DSP software, particularly vRAN architectures deployed by telecom operators.

SUMMARY

Embodiments herein provide a virtual Radio Access Network (vRAN) system for provisioning a virtual Radio Access Network (vRAN) that is portable across one or more RAN hardware platforms. The virtual Radio Access Network (vRAN) system includes a waveform development kit, and a waveform execution environment. The waveform execution environment includes a RAN hypervisor. The waveform development kit defines at least one portable Radio Access Network (RAN) application into a form that is instantiated on a RAN hardware. The waveform execution environment (i) monitors schedulable resources in real-time, and (ii) collects one or more statistics and monitors the one or more statistics for network automation. The RAN hypervisor virtualizes at least one attribute of a spectral resource required to provision the virtual Radio Access Network (vRAN) that is portable across at least one hardware platform of the one or more RAN hardware platforms in the RAN hardware based on a description of at least one hardware compute resource in the RAN hardware.

In some embodiments, the waveform development kit includes (i) a defined Domain Specific Language (DSL) that captures at least one domain-specific pattern for describing functions associated with the Radio Access Network (RAN) and (ii) a compiler that converts a Platform Independent (PI) signal processing algorithm that is described in the defined Domain Specific Language (DSL) to a byte code or an intermediate representation (IR) for execution on a RAN targeted hardware.

In some embodiments, the defined Domain Specific Language (DSL) includes (i) a stream process function that operates on at least one of the incoming streams of frames, packets, symbols, or samples, and (ii) a control process function that emits signals to indicate conditions at a time of processing the stream type. The stream process function (i) obtains a stream type and converts the stream type to another stream type or (ii) performs an operation on each element of a stream type. The signals are consumed by at least one of (i) other control process functions or (ii) stream process functions to perform another action or alter a path of execution.

In some embodiments, the RAN hypervisor includes (i) a RAN compute hypervisor that provides a platform for Virtual Machines (VMs) on which a RAN modem instance is executed, and (ii) a RAN spectral hypervisor that virtualizes an RF hardware that is used for building Radio Units and modem independent RF attributes that are stored in a RF attribute database.

In some embodiments, the RAN hypervisor distributes and manages dynamic load associated with the virtual Radio Access Network (RAN) across processing elements (PE) by scheduling a multiple RAN modem instance of Radio Access Network (RAN) and Digital Signal Processing (DSP) flow-graphs on heterogeneous processing elements.

In some embodiments, the virtual Radio Access Network (vRAN) system includes a RAN orchestrator that creates, deletes, or modifies the RAN modem instances of one or more radio virtual machines (RVM) for RAN containers which execute on the RAN Hypervisor. The RAN orchestrator instantiates and co-ordinates various modem entities created on the RAN hypervisor by understanding scheduling information and runtime specifications bundled along with each RAN modem instance.

In some embodiments, the virtual Radio Access Network (vRAN) system includes a modem store is a cache or the RAN modem instance of intermediate representations of different waveforms generated by the waveform development kit. The intermediate representations are combined with a scheduling information and runtime specification derived from constraints on the at least one domain-specific pattern specified in the defined Domain Specific Language (DSL) model for execution on the targeted hardware. The intermediate representations are hosted on the modem store along with the scheduling information and the runtime specification.

In some embodiments, the modem store is connected with the RAN orchestrator to enable a provision of modems and resources required to execute the virtual Radio Access Network (RAN).

In some embodiments, each runtime specification is a configuration database that describes various runtime and code generation specific aspects that enable the RAN Hypervisor to appropriately map an intermediate representation (IR) of the RAN modem instance to the RAN hardware.

In some embodiments, the RAN hypervisor manages usage of computing elements on the RAN hardware. Security features provided by the RAN hardware and policies provided in the RAN orchestrator are used by the RAN hypervisor to manage the at least one attribute associated with the computing elements.

In some embodiments, a mapper maps each RAN modem instance to an actual physical processing element across the RAN hardware by (i) analyzing a detailed description of computing, storage and interconnect resource elements in each RAN hardware, (ii) correlating the detailed description with a multitude of constraints that are provided by a runtime specification for each modem instance and (iii) creating a mapping of the RAN modem instance across the processing elements of underlying the RAN Hardware. The detailed description is provided in the Hardware Resource Description (HRD).

In some embodiments, multiple hierarchies of the hyper-monitor function include at least one of: (a) a hardware function block that monitors selectable hardware signals and provides an interface function to move out data at wire speeds to the hyper-monitor function for storage, (b) a low-level software function block interacts with the RAN hardware and sets control signals to monitor a set of functionalities, and (c) a software function that is located inside the RAN hypervisor to perform store and query a database that is created by the hyper-monitor function. The low-level software function block runs in a small inference engine to determine the control signals. The low-level software function block provides filter signals to reduce unnecessary data transfers. The software block runs inferences on stored data for use in automation and the Radio Interface Controller (RIC).

In some embodiments, the virtual Radio Access Network (vRAN) system slices a radio frequency channel and virtualizes in at least one of time domain, frequency domain or spatial domain to enable an implementation of slicing concept in 5G and other communication modems.

In some embodiments, the RAN spectral hypervisor uses Artificial Intelligence (AI) prediction engines on the RF attribute database and designs an RF attribute aware waveform for utilization of spectral resources.

In another aspect, a method of provisioning a virtual Radio Access Network (RAN) that is portable across one or more RAN hardware platforms is provided. The method includes (i) defining at least one portable Radio Access Network (RAN) application into a form that is instantiated on a RAN hardware by a waveform development kit, (ii) monitoring schedulable resources in real-time by a waveform execution environment, (iii) collecting one or more statistics, and monitoring the one or more statistics for network automation by the waveform execution environment, and (iv) virtualizing at least one attribute of a spectral resource required to provision the Radio Access Network (RAN) that is portable across at least one hardware platform of the one or more RAN hardware platforms in the RAN hardware based on a description of at least one hardware compute resource in the RAN hardware using a RAN hypervisor.

In some embodiments, the method includes scheduling multiple RAN modem instance of RAN flow-graphs to dynamically share RAN workload across Processing Elements (PE's) using the RAN hypervisor.

In some embodiments, the method includes allowing dynamic reconfiguration of the RAN hardware based on RF and signal conditions using hyper observability.

In some embodiments, the method includes auto-learning based on past decisions and inputs from a hyper-monitor for utilization of spectral resources.

In some embodiments, the method includes mapping each RAN modem instance to an actual physical processing element across the RAN hardware by (i) analyzing a detailed description of computing, storage and interconnect resource elements in each RAN hardware, (ii) correlating the detailed description with a multitude of constraints that are provided by a runtime specification for each modem instance, and (iii) creating a mapping of the RAN modem instance across the processing elements of the underlying RAN Hardware.

In some embodiments, the method includes (a) monitoring selectable hardware signals and providing an interface function to move out data at wire speeds to the hyper-monitor function for storage, (b) interacting with the RAN hardware and setting control signals to monitor a set of functionalities, and (c) performing store and query of a database that is created by the hyper-monitor function. Filter signals are provided to reduce unnecessary data transfers. Inferences run on stored data for use in automation and the Radio Interface Controller (RIC). A small inference engine runs to determine the control signals.

The Domain Specific Language (DSL) model of the virtual Radio Access Network (vRAN) system in conjunction with the runtime system is hardware-independent and does not rely on static mapping to the hardware. The DSL Model provides a description of (i) various RAN related constructs such as the number of carriers, pilot modes and definition on new pilot modes, (ii) RAN specific invariants such as noise figure, timing constraints, (iii) definition of feedback loops associated to the RAN, (iv) definition of fast and slow paths in a RAN environment. In some embodiments, the paths of RAN include broadcast paths. The DSL Model enables users to define their stream processors. The Waveform Development Kit converts the DSL Model into a byte code which is mapped onto the underlying hardware by the RAN hypervisor. The RAN hypervisors virtualizes jointly, the computing resources along with the RF resources. The RAN hypervisor virtualizes the attributes of spectral resources such as interference, fading, and others. The RAN hypervisor allows easy load balancing of virtual RAN modems.

An AI-first architecture that pervades from dynamic data paths in hardware to the RAN hypervisor and the RAN modems themselves. As an example, the AI-driven monitor path that aids load balancing and reporting of vital statistics for optimization and load balancing by the RAN hypervisor. The virtual Radio Access Network (vRAN) system enables a clean abstraction of any new RAN hardware to allow portability without having to change the Waveform Execution Environment. The virtual Radio Access Network (vRAN) system implements vRAN architecture efficiently. The virtual Radio Access Network (vRAN) system includes an ability to introduce Microservices for the RAN by enabling the addition of new components to the Signal processing pipeline on the fly and addition of dynamic monitors. The virtual Radio Access Network (vRAN) system virtualizes both radios and compute resources to enable optimal implementation of network slices and optimal usage of radio resources. The virtual Radio Access Network (vRAN) system provides architecture constructs to collect real-time data and run inference for the Radio Interface Controller (RIC) and enforce good design practices such as separation of concerns. The vRAN system reduces debug, provisioning time for vRAN deployment. The virtual Radio Access Network (vRAN) system includes highly scalable hardware architecture for efficient execution of RAN modems and DSP applications.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 8 is a schematic diagram of a computer architecture in accordance with the embodiments herein.

DETAILED DESCRIPTION OF EMBODIMENTS

Figure 1:
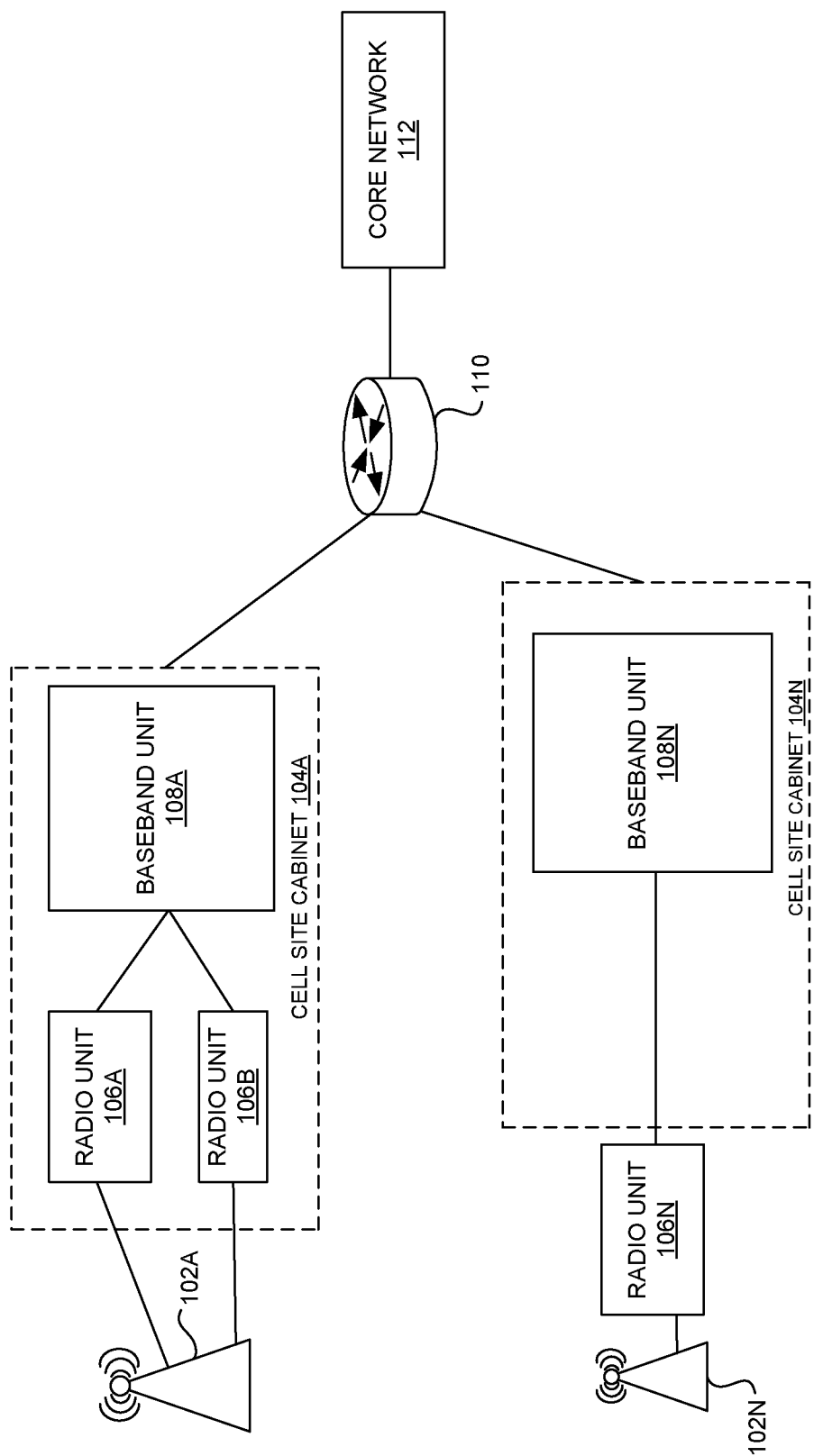
FIG. 1 is a block diagram of a traditional Radio Access Network (RAN) architecture according to a prior art.
Figure 2:
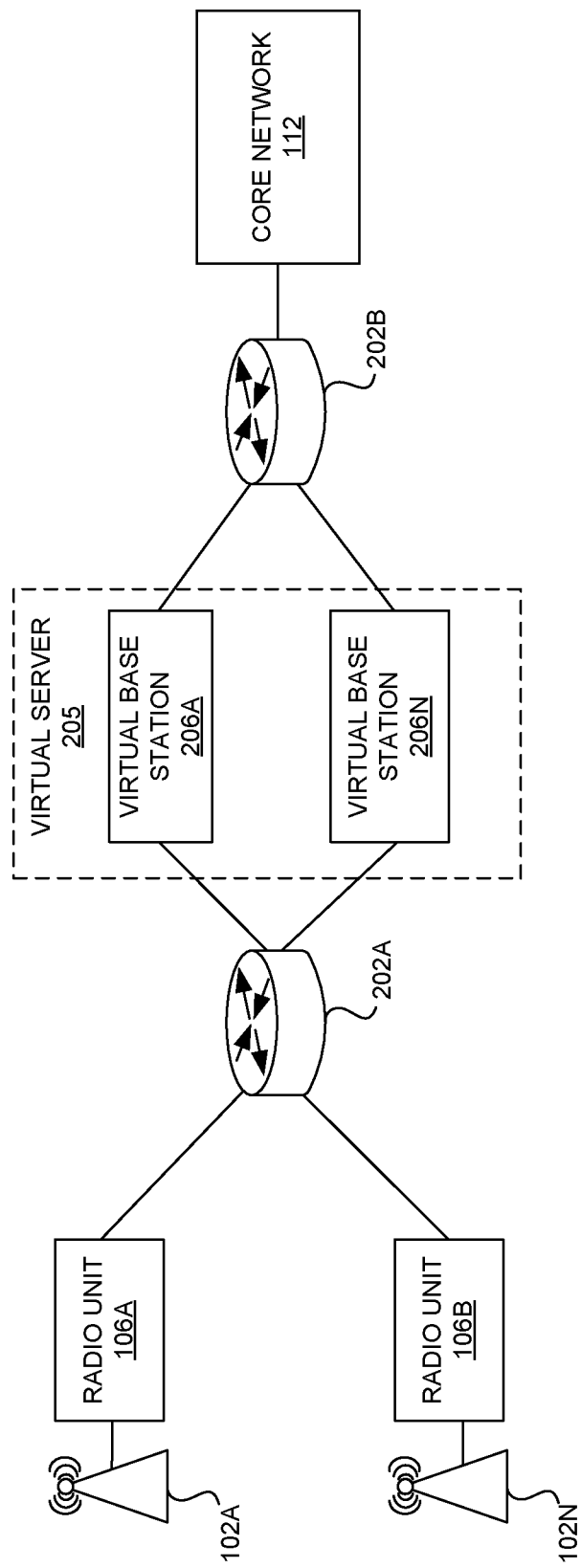
FIG. 2 is an exemplary system diagram of traditional Virtual Radio Access Network (vRAN) architecture according to a prior art.

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

Definitions

Hypervisor: Hypervisor is a module that is executed on any computing device to create and manage virtual machines and virtualizes underlying resources. In some embodiments, the hypervisor refers to a module that presents virtual machines with a unified view of RAN hardware resources. The virtual machines are modems that execute as modules in or above the hypervisor and use the RAN hardware resources. The RAN hardware resources are at least one of a cluster of DSPs or FPGA's or any other compute element. In some embodiments, the RAN virtual machines are viewed as a RAN OS. The RAN OS within a virtual machine may execute single or multiple instances of the modem. In some embodiments, the Hypervisor performs scheduling to provide a time slice for a guest RAN OS to run on the processor core.

Containers: Containers enable several instances of an application to run over the same operating system. In some embodiments, the containers virtualize the operating system when the virtual machines virtualize the hardware.

VNF (virtual network functions): VNF (virtual network functions) are network elements that are implemented as software components and run on virtual machines or containers. In some embodiments, the orchestrator allocates resources to the VNF.

Flow-graph: The flow-graph is a sequence of interconnected processing nodes that perform a unidirectional modem function. The implementation of a RAN modem requires at least 2 flow graphs one in each direction (Downlink and Uplink). A RAN flow-graph is a flow graph that implements the RAN functionality.

Hypermonitor: The Hypermonitor is an entity that collects statistics from the underlying processing elements regarding resource utilization and the workload to feed the orchestrator to optimize the overall efficiency of the complete system. In some embodiments, the Hypermonitor may provide inputs directly to the hypervisor. In some embodiments, there are two kinds of statistics (i) statistics pertaining to resource usage, allocation, and other attributes of the processing element that includes the RAN hardware and (ii) statistics related to the modem's baseband and RF functionality such as Noise Figure, CQI and other attributes. In some embodiments, the two kinds of statistics may allow instantiations of a dynamic component of the Hypermonitor running as software on the RAN hardware.

In some embodiments, the Radio Virtual Machine (RVM) or the modem may instantiate a Hypermonitor component specific to its functionality and provide interfaces and inputs to the Hypervisor for optimal resource allocation or other cost functions like power and/or performance.

There is a need to implement RAN functions in a virtualized manner independent of a RAN hardware platform, which is portable. The present system allows the design and deployment of portable RAN solutions through RAN containerization. The present system pertains to the design of a) software implementation of a physical layer in a baseband unit and a Radio unit and b) servers on which the software runs. The portable RANs are designed and implemented by (i) building upon and combining concepts of a Domain-Specific Language (DSL) for describing and designing a RAN software in a platform-agnostic manner, (ii) virtualization through a hypervisor that virtualizes Radio Frequency (RF) and RAN compute resources and (iii) utilizing a RAN hardware on which the RAN functions can be mapped (e.g. platforms which can implement Digital Signal Processing (DSP) functions).

In the present vRAN system, portability of RAN software across any hardware implementation is achieved through (i) a method of describing DSP functions (for RAN and other applications) in a platform-agnostic manner using the Domain-Specific Language (DSL) and (ii) a method of executing one or more RAN functions on given hardware while meeting the timing deadlines, latency, coherency of data and processing requirements for the described function.

In the present vRAN system, dynamic sharing of RAN workload across Processing Elements (PE's) is achieved through the use of RAN-Hypervisor using a method of scheduling multiple instances of RAN flow-graphs on heterogeneous processing elements (for instance but not limited to CPUs, acceleration units or FPGAs), data holding memories, data transfer engines, and communication buses.

The present vRAN system relies on highly scalable hardware architecture for efficient execution of DSP functions for RAN and other applications. In the present vRAN system, pooling gains described in vRAN are maximized by scaling of DSP processing. The present vRAN system includes hyper observability that allows dynamic reconfiguration of the hardware-based on RF and signal conditions. The present vRAN system further includes RAN AI acceleration engines at each level of computing hierarchy from hardware data paths that form a processing element to Digital Signal Processors or any other processing elements like the FPGA, to the Hypervisor software and the virtual machine software.

The vRAN system includes hardware and software functions such as a Hyper-Monitor that enables speed up and improves the RAN functionality and improves the ability of the hypervisor to better virtualize the resources such as the PE. Another aspect of the hypervisor is the ability to auto-learn based on past decisions and inputs from the Hypermonitor. All decisions on how resources are split and distributed are stored in the Hypermonitor database. The inference engine runs partly on the hypervisor and partly on the RAN hardware for optimal usage for various cost functions defined. The Hypermonitor acts on specific triggers configured in a Processing Element (PE) to collect data for inferencing the workload conditions and dynamically reconfigures the PE. The collected parameters are used for achieving optimal performance in terms of various cost functions (for example but not limited to power consumption, die size, etc).

In the present vRAN system, there is a separation of the definition and design of signal processing algorithms from their actual execution on a platform. With this, a signal processing function designed for RAN and other modems/communication receivers are abstracted into two major components (i) a platform-independent portion (PI) and (ii) a platform-dependent function (PD).

The platform-independent portion (PI) describes an algorithm or "what" part and is usually done by skilled practitioners that do not have knowledge of the hardware, e.g., prototyping in frameworks such as MATLAB and Octave.

The platform-dependent function (PD) converts a signal processing algorithm for implementation on specific hardware to optimize the power and cost of the implementations. These tend to be done using a specialized combination of software and hardware.

The present vRAN system includes a method to describe the platform-dependent function and the platform-independent function of a signal processing application to achieve cross-platform portability.

DETAILED DESCRIPTION OF THE DRAWINGS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a system and method to design portable Radio Access Network (RAN) modems and Digital Signal Processing (DSP) applications. Referring now to the drawings, and more particularly to FIGS. 3A through 8, where similar reference characters denote corresponding features consistently throughout the figures, there are shown preferred embodiments.

Figure 3A:
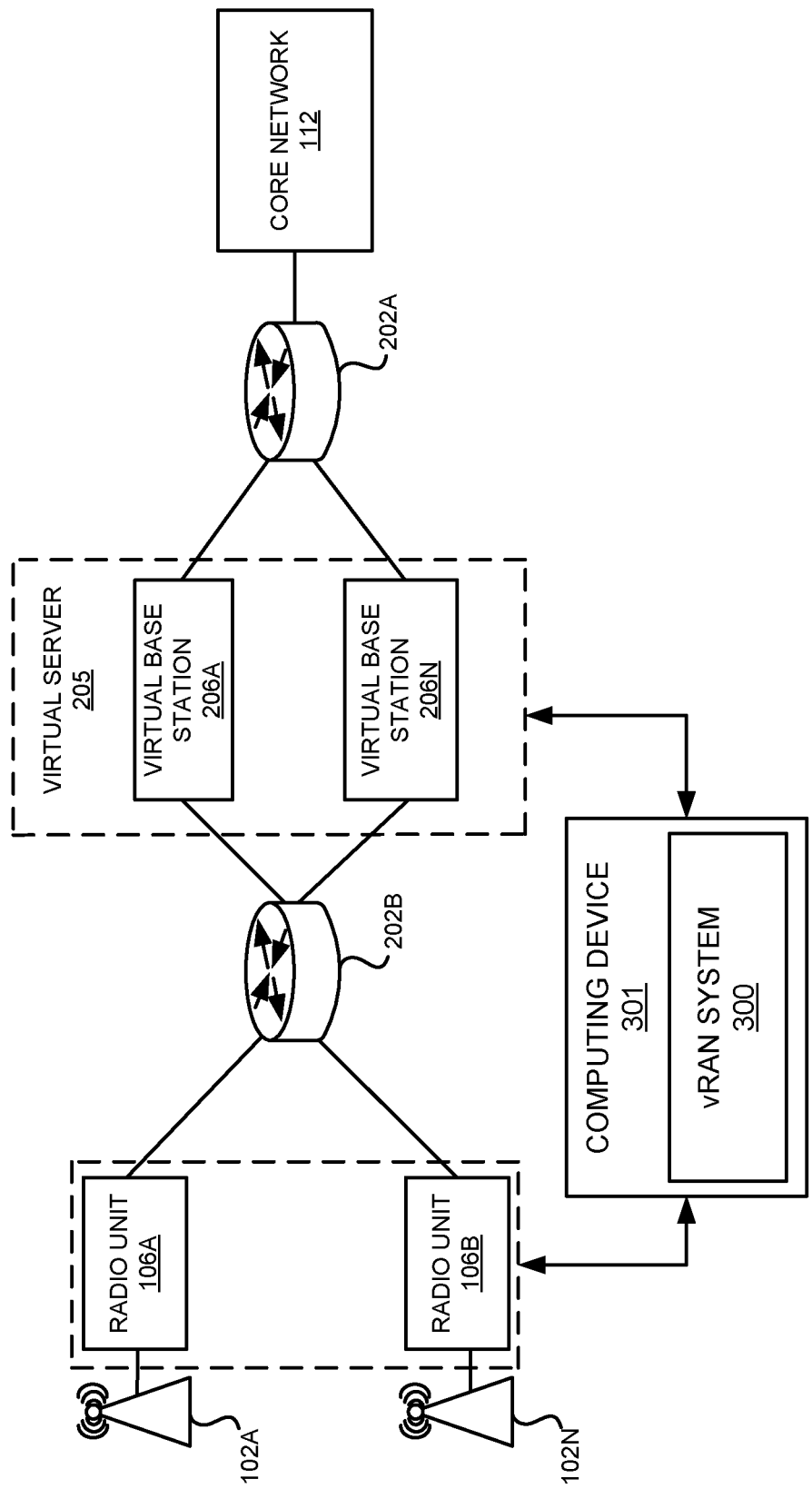
FIG. 3A is a block diagram that illustrates a virtual Radio Access Network (vRAN) system for provisioning of a virtual Radio Access Network (vRAN) that is portable across one or more RAN hardware platforms according to some embodiments herein.

FIG. 3A is a block diagram that illustrates a virtual Radio Access Network (vRAN) system 300 for provisioning of a virtual Radio Access Network (vRAN) that is portable across one or more RAN hardware platforms according to some embodiments herein. The virtual Radio Access Network (vRAN) system 300 executes components and modules of the virtual Radio Access Network (vRAN) system 300 in a computing device 301 to design the virtualized RAN modems and DSP applications associated with functions of the set of radio units 106A-B and the virtual base station 206A-N. In some embodiments, the components may include a hypervisor, an orchestrator, and containers which are associated with an execution environment. In some embodiments, the orchestrator is responsible for control and lifecycle management of virtual machines. In some embodiments, the computing device 301 is selected from at least one of a compute server, personal computer, a tablet, a laptop, or an electronic notebook. In some embodiments, the one or more RAN hardware platforms includes, but are not limited to an ISA or a DSP based platform, a FlexRAN platform, a SoC ASIC based platform, and an FPGA based platform.

Figure 3B:
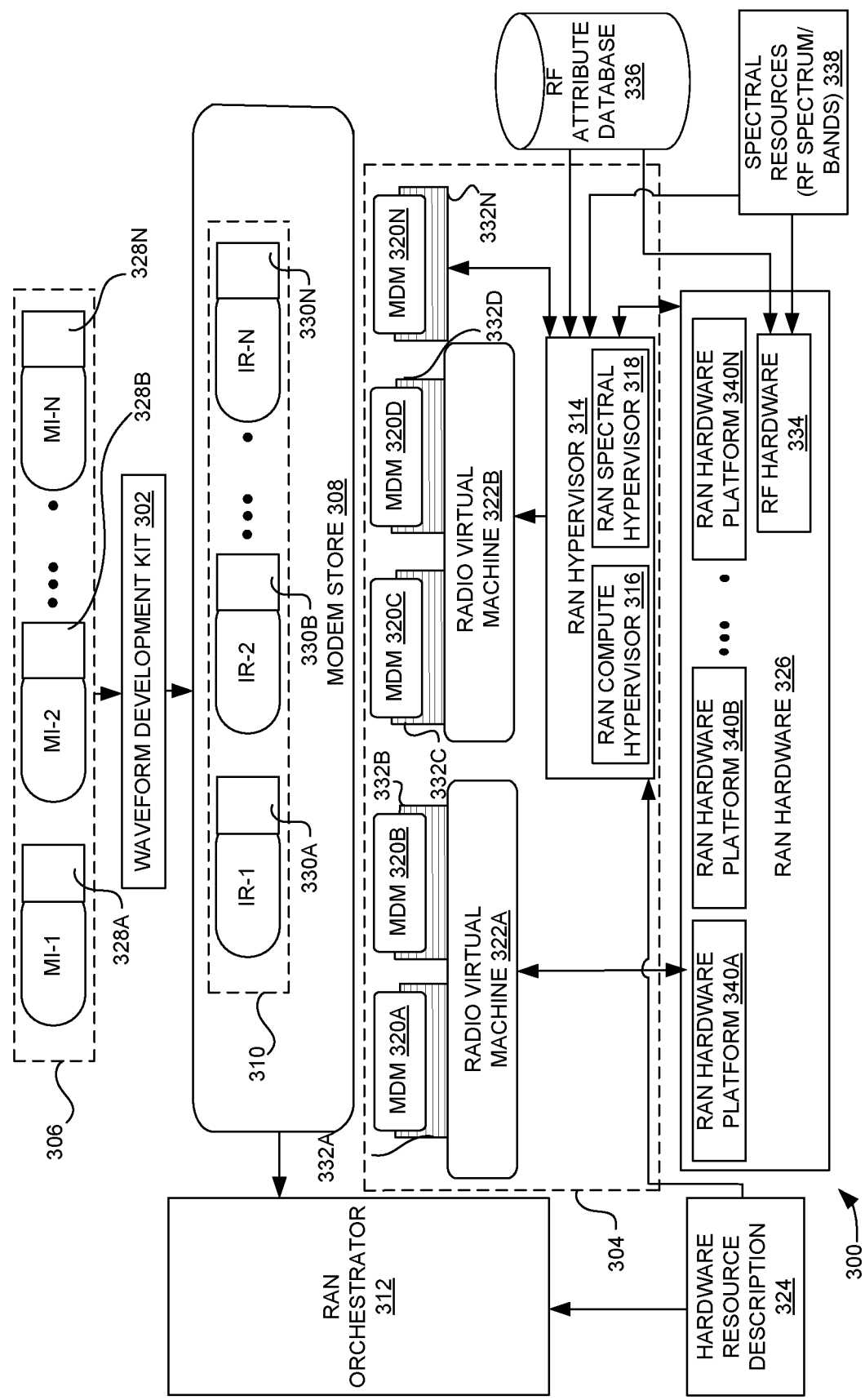
FIG. 3B illustrates an exploded view of the virtualized Radio Access Network (vRAN) system of FIG. 3A according to some embodiments herein.

FIG. 3B illustrates an exploded view of the virtual Radio Access Network (vRAN) system 300 of FIG. 3A according to some embodiments herein. The virtual Radio Access Network (vRAN) system 300 includes a waveform development kit (WDK) 302, a waveform execution environment 304, a RAN orchestrator 312, and a hardware Resource Description 324. The WDK 302 includes a defined Domain Specific Language (DSL) for describing the functions associated with the portable RAN modems and the DSP applications (not shown in the diagram), a compiler or an interpreter (not shown in the diagram) and a modem store 308 and a runtime specification for each of the DSP applications. The waveform execution environment 304 includes a RAN hypervisor 314, one or more modems 320A-N from within the modem Store 308 respective RAN containers 332A-N and Radio Virtual Machines (RVM) 322A-B. The Radio virtual machines (RVM) 322A-B perform rudimentary functions of a typical operating system such as scheduling and address space separation to allow each modem to run as an independent slice.

The waveform development kit (WDK) 302 is the development environment for defining portable RAN applications and converting the portable RAN applications into a form that is instantiated on a RAN hardware 326. RAN signal processing applications are directed flow-graphs that operate on a stream of data. The defined DSL captures these domain-specific patterns (example: flow-graphs). In some embodiments, if new patterns are coded in procedural languages like C, it is complex and time-consuming to develop or comprehend and results in increased complexity representation of the system. The ability to describe patterns and abstractions in the domain makes it easier to build complex systems much faster.

The defined DSL provides an abstraction to describe modem flow graphs to build complex RAN modems and the DSP applications that make their development faster and easier. In some embodiments, the defined DSL provides built-in types for domain-specific operations such as FFT, filtering, convolution, etc. In some embodiments, the defined DSL allows the addition of other built-in types derived from at least one of base types or new operations. The defined DSL handles fixed-point types natively and allows the developer to focus on the abstraction of the functions required for modem flow-graphs without delving into the implementation details. In some embodiments, the defined DSL is at least one of a new language or implemented in any host language such as C++, Rust, etc. The defined DSL includes a stream process function, a control process function, and additional mechanisms to connect different stream process functions and schedule their execution based on them. The stream process function operates on at least one of the incoming streams of frames, packets, symbols, or samples. The stream process function (i) obtains a stream type and converts the stream type to another stream type or (ii) performs an operation on each element of a stream type. For example, a scrambler obtains a bitstream and generates another bitstream. In some embodiments, a symbol mapper obtains a stream of bits and generates a stream of symbols. The DSL provides built-in functions to perform the aforementioned operations. In some embodiments, the DSL enables a user to create generic stream process functions or built-in stream process functions.

The control process function emits signals to indicate conditions at a time of processing the stream. For example, a synchronization process that emits a signal when symbol or frame boundaries are detected. In some embodiments, the signals are consumed by at least one of (i) other control process functions or (ii) stream process functions to perform another action or alter a path of execution. The defined DSL includes the one or more mechanisms to connect stream process functions using data ports that include appropriately specified input or output directions. The defined DSL includes one or more mechanisms to schedule activity of the stream process function in parallel or serial order in time. The defined DSL includes constructs to specify the timing, data rate, or all other constraints on any of the stream process function's input or output ports. These are examples of the DSL used herein and are intended merely to facilitate an understanding of ways in which the embodiments herein may be practiced and to further enable those of skill in the art to practice the embodiments herein. Accordingly, the examples should not be construed as limiting the scope of the embodiments herein.

The compiler or interpreter converts a Platform Independent (PI) signal processing algorithm described in DSL, called a DSL Model, to byte code or intermediate representation (IR) 310 for execution on a targeted hardware. In some embodiments, the IR 310 is bundled with the scheduling information and runtime specification 330A-N derived from constraints on the flow graph specified in a DSL Model. The IR 310 along with the scheduling information and the runtime specifications 330A-N are hosted on the modem store 308. The modem store 308 is a cache or one or more instances of intermediate representations of different waveforms generated by the WDK 302. In some embodiments, the byte code may run on any platform either in a virtual Machine (VM) or in the RAN containers 332A-N which provide isolation between the execution of multiple instances of the modem.

In some embodiments, the RAN containers 332A-N enable several instances of applications in the same operating system by virtualizing the operating system resources or enable multiple instances of the RAN containers 332A-N on multiple operating systems when the virtual machines are present to virtualize a RAN hardware 326. Each runtime specification 328A-N is a configuration database that describes various runtime and code generation specific aspects that enable the RAN Hypervisor 314 to appropriately map the IR of a Modem Instance 306 to the RAN hardware 326. Each runtime specification 328A-N specifies at least one parameter which may be part of the runtime specification 328A-N of (i) width of the data type mentioned in the defined DSL Model, (ii) numeric representation that is identified automatically as a part of a simulation process, (iii) constraints on overall Noise Filter or digital noise, (iv) support for specifying all kinds of environments such as Simulation environments Matlab, octave, FlexRAN, NXP, and other Platforms, (v) buffer management types and IQ sample buffer types which may be at least one of interleaved or collocated, (vi) the width of the data type mentioned in the DSL Model may be applied per block in the pipeline or for the entire chain.

In some embodiments, the RAN orchestrator 312 is responsible for creating, deleting, or modifying the instances of the virtual machine for the RAN containers 332A-N which execute on the RAN Hypervisor 314. This includes scaling up and scaling down the instances. In some embodiments, the hardware Resource Description 324 is at least one of (i) hierarchy of processing elements on lines of cores, processing elements, etc. (ii) latencies for memory accesses and a memory hierarchy, (iii) details such as performance, power, data, code size requirement of each processing element, (iv) number of processing tiles, number, and type or characteristics of a processor within a tile and (v) description of the network of interconnect buses that connect various processing elements and its properties and protocol such as topology, connectivity graph of tiles, data widths and transfer rate. In some embodiments, the modem store 308 is connected with the RAN orchestrator 312 to enable the provision of the modems and resources required to execute the RAN modems and the DSP functions.

The RAN orchestrator 312 provides flexibility for running the Radio virtual machines (RVM) 322A-B from different vendors. The RAN orchestrator 312 instantiates and co-ordinates between various modem entities spawned on the RAN hypervisor 314 by understanding scheduling information and runtime specifications 328A-N bundled along with each modem instance 306.

The RAN hypervisor 314 jointly virtualizes the attributes of spectral resources 338 and compute required to provision the RAN functionality on the spectral resources 338 (example: spectrum). In some embodiments, the RAN hypervisor 314 distributes and manages dynamic load associated with the RAN modems and the DSP applications across the processing elements by scheduling multiple instances of RAN and DSP flow-graphs on heterogeneous processing elements. In some embodiments, the RAN containers 332A-N host applications associated with the RAN modems and the DSP applications on the RAN hypervisor 314 directly. In some embodiments, RAN virtual machines execute instances that are associated with the RAN modems and the DSP applications in bare-metal containers or the Radio Virtual Machines (RVM) 322A-B.

The Waveform Execution Environment 304 includes a Hypermonitor (book-keeping) function that performs at least one of (i) real-time monitoring of schedulable resources to identify cost functions associated with using these resources, (ii) collecting, one or more statistics required by the RAN hypervisor 314 for network automation or (iii) storing data for offline inferencing to improve the RAN hypervisor 314 performance. In some embodiments, the statistics of the RAN and DSP include at least one of the constellations, Channel Impulse response, interference, Bit error rate (BER), received signal strength indicator (RSSI) or other Radio Frequency channel quality indicators. The Virtual Server 205 (as shown in FIG. 3A) represents the Waveform Execution Environment 304 on which the Modem instanced generated by the Waveform Development Kit (WDK) 302 are executed. These modem instances represent the Virtual Base Stations 206A-N as shown in FIG. 3A. The RAN orchestrator 312 on the virtual server 205 manages the instantiation and lifecycle management of the virtual base stations 206A-N.

The RAN hardware 326 includes the one or more RAN hardware platforms 340A-N that include, but not limited to an ISA or a DSP based platform, a FlexRAN platform, a SoC ASIC based platform, and an FPGA based platform.

In some embodiments, multiple hierarchies of the Hypermonitor function include at least one of a hardware function block, a low-level software function, or a software function. The hardware function block monitors selectable hardware signals and provides an interface function to move out data at wire speeds to the Hypermonitor function for storage. The low-level software function block interacts with the hardware and sets control signals to monitor a set of functionalities. The low-level software function block may run in a small inference engine to determine the control signals. In some embodiments, the low-level software function block may provide filter signals to reduce unnecessary data transfers. The software function located inside the RAN hypervisor 314 may be used to store and query a database that is created by the Hypermonitor function. The software block may run some inferences on the stored data for use in automation and the Radio Interface Controller (RIC).

In some embodiments, trigger conditions are varying from (i) simple pattern match conditions on data/signals or measured statistical properties of signal or events in the Modems, (ii) output of a pre-defined finite state machine with state transition sequences. In some embodiments, store conditions include (i) store a specified number of samples or every sample of the signal after meeting a trigger condition and (ii) store samples at specified discrete events generated by a state machine. Hardware supports the implementation of a programmable state machine and enables detection of certain pre-defined statistical properties of signals, e.g., mean, standard deviation, the dynamic range of the signal, programmable state transitions, states which are based on values of the signal. Such a hardware-based mechanism allows for wire-speed processing of data to extract properties in real-time.

Figure 3C:
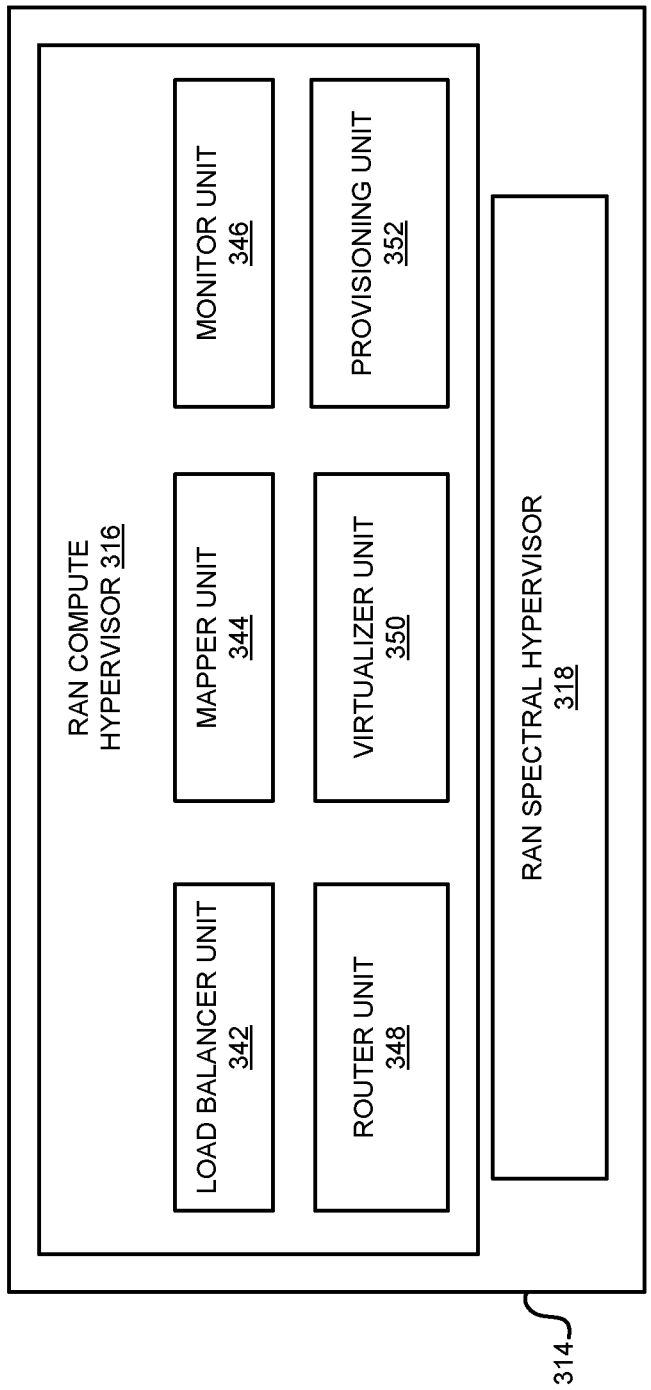
FIG. 3C is an exploded view of a RAN hypervisor of FIG. 3B according to some embodiments herein.

FIG. 3C is an exploded view of the RAN hypervisor 314 of FIG. 3B according to some embodiments herein. The RAN hypervisor 314 uses constraints on the overall NF or the digital noise to optimize a usage of computing elements on the RAN hardware 326. The RAN hypervisor 314 includes a RAN compute hypervisor 316 and a RAN spectral hypervisor 318. The RAN compute hypervisor 316 provides a platform for Virtual Machines (VMs) on which the RAN modems may execute. The RAN compute hypervisor 316 includes a load balancer unit 342, a mapper unit 344, a monitor unit 346, a router unit 348, a virtualizer unit 350 and a provisioning unit 352. The load balancer unit 342 tracks processing elements (PE) of hardware and allocates the processing elements (PE) to virtual machines of the virtual RAN. The load balancer unit 342 manages abstract variables (example: buffers of data), abstract variables lifetimes and mapping to memory, scheduling of data transfers, and avoiding data overflow or underflow hazards. In some embodiments, the load balancer unit 342 tracks load on each RAN instances and uses statistical multiplexing of processing load to resize the virtual machine. In some embodiments, the load balancer unit 342 includes a Hypermonitor function that is associated with each RAN instance that tracks Radio Bearers (RBs) scheduled and a dynamic load associated with the RAN instances.

The mapper unit 344 schedules RAN instances on the RAN hardware 326 and manages the RAN instances. Each RAN modem instance 306 that is spawned has peak load and resource requirements. Each RAN modem instance 306 is mapped by the mapper unit 344 to an actual "physical processing element" across the RAN hardware 326. The mapper unit 344 analyses a detailed description of computing, storage and interconnect resource elements in each RAN hardware 326. In some embodiments, the detailed description is provided in the Hardware Resource Description (HRD) 324. The mapper unit 344 correlates the detailed description with a multitude of constraints that are provided by a runtime specification for each Modem instance 306 and thus creates a most efficient mapping of the RAN modem instance 306 across the processing elements of the underlying the RAN Hardware 326.

In some embodiments, the mapper unit 344 is designed such that a given modem instance 306 may be efficiently mapped to any RAN Hardware as long as an HRD description may be provided for the RAN Hardware 326. The mapper unit 344 keeps track of a load based on actual run statistics and scales the processing power up or down. In some embodiments, if a new thread is introduced, peak demand resources are allocated to that instance. The monitor unit 346 obtains statistics and monitors the RAN modems for high-level functions. The router unit 348 sets DMA from a front haul to various memories and also performs memory transfer between several memory and interconnect bus hierarchies. The virtualizer unit 350 virtualizes RAN hardware resources. The provisioning unit 352 provisions a new modem instance 306.

In some embodiments, the RAN hypervisor 314 uses hardware primitives or assistance provided by the Hypermonitor or any such function to speed up the mapping and scheduling process. The RAN hypervisor 314 uses the security features provided by the hardware and the policies mentioned in the RAN orchestrator 312 to limit access to some aspects and attributes of the underlying RAN hardware 326. The RAN spectral hypervisor 318 virtualizes spectral resources 338 such as the spectrum along with attributes such as interference, sharing attributes such as unlicensed, licensed, among others. In some embodiments, the RAN spectral hypervisor 318 enables for late binding of the RAN modems described by the Domain Specific Language (DSL) to corresponding spectral resources. The RAN spectral hypervisor 318 enables at least one of (i) an RF channel that is partitioned or shared between multiple radios based on the various cost of functions, e.g., a single RF channel is partitioned to run at least one of IoT radios, broadcast radios, and modems of potentially any kind, (ii) aggregation of discontinuous RF channels and present it as a single RF channel or (iii) virtualize and share a given piece of the spectrum independently across modems. In some embodiments, the RF channel is sliced and virtualized in at least one of time domain, frequency domain or spatial domain (mapping to Antennas) to enable an efficient implementation of "slicing" concept in 5G and other communication modems.

In some embodiments, the RAN spectral hypervisor 318 virtualizes an RF hardware 334 used for building the set of Radio Units 106A-B and a modem independent RF attributes such as interference and fading, an adjacent channel, rejection, protection ratio, ACLR/ACPR and licensed and unlicensed bands stored in a RF attribute database 336. Virtualizing attributes specific to the RF resource helps modems concatenate multiple RF channels and help split channels without worrying about RF specific characteristics. The RF attributes of the Spectral resources 338 are sensed by the RF hardware 334 and stored in the RF attribute database 336. The RAN hypervisor 314 uses the information to allocate physical RAN hardware resources and implement attribute specific corrections like pre-coding independent of the modem implementation. The RAN hypervisor 314 may implement channel sounding signals independent of the modem standard. In other embodiments, the RAN spectral hypervisor 318 use Artificial Intelligence (AI) prediction engines on the RF attribute database 336 and design an RF attribute aware waveform for better utilization of the spectral resources 338.

Figure 4:
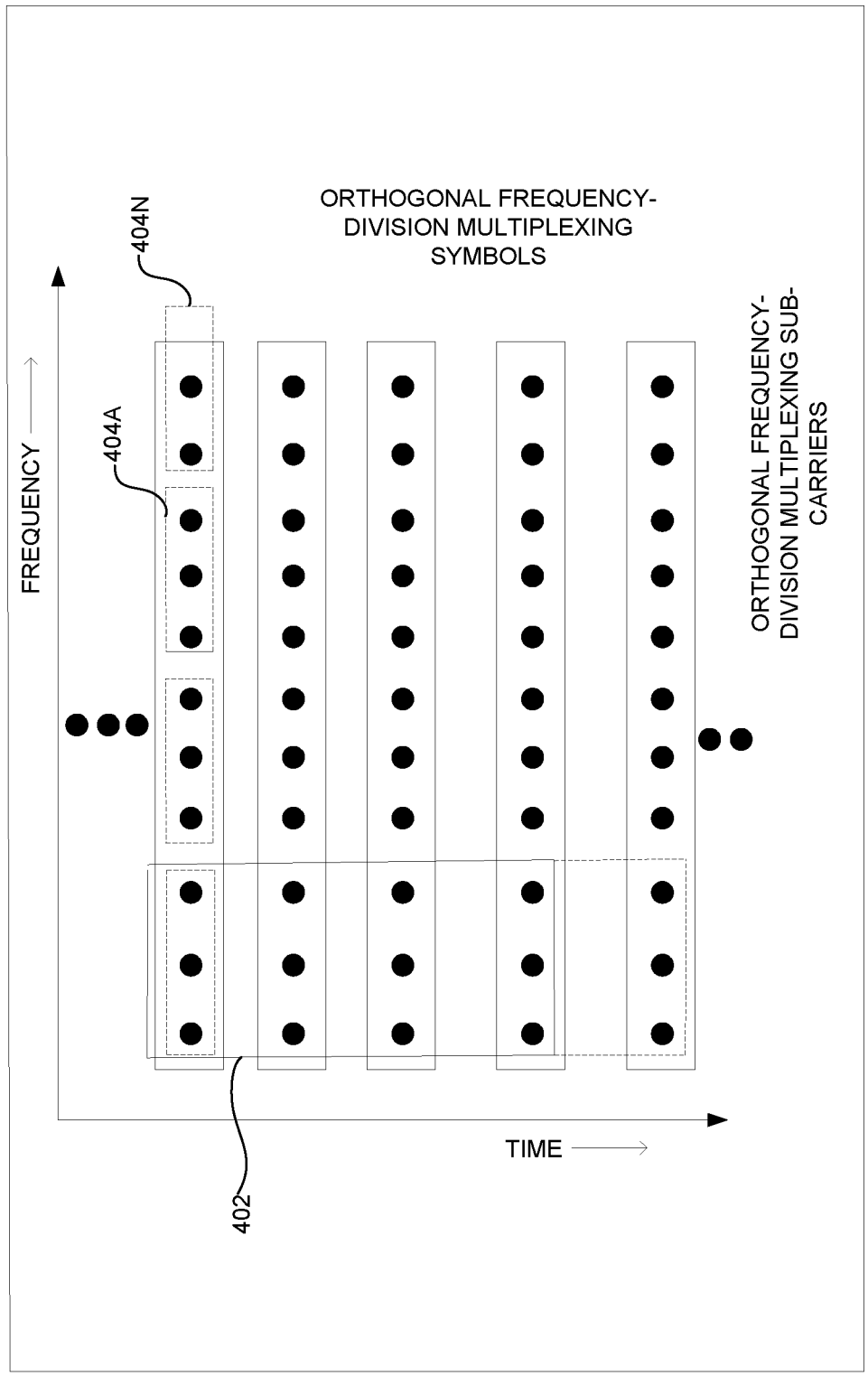
FIG. 4 is a graphical diagram that illustrates a relation between orthogonal frequency-division multiplexing (OFDM) signals and orthogonal frequency-division multiplexing (OFDM) sub-carriers according to some embodiments herein.

FIG. 4 is a graphical diagram that illustrates a relation between orthogonal frequency-division multiplexing (OFDM) signals and orthogonal frequency-division multiplexing (OFDM) sub-carriers according to some embodiments herein. The graphical is mapped between frequency and time for analyzing the OFDM sub-carriers and OFDM symbols to determine an averaging window 402 associated with the Hypermonitor. In some embodiments, the OFDM sub-carriers may include one or more sub-bands 404A-N. The Hypermonitor function enables at least one of dynamic range detection, noise power estimation, SNR estimation or delay spread estimation when designing the portable RAN modems and DSP applications. The dynamic range detection determines an optimum scaling factor required for different types of operation programmatically in a component of a Signal Processing Chain.

The scaling factors types used are (i) Scaling by the sum of magnitude of impulse response (L1 norm), (ii) Scaling by the square root of the sum of squared magnitude of impulse response (L2 norm) and (iii) Scaling by maximum of frequency response (Chebyshev norm). In scaling by the sum of magnitude of impulse response (L1 norm), this method constrains magnitude of a digital system at any node to be less than 1 for a system using Q.M format, where M is equal to the (P−1), where P is the number of bits used for fixed-point representation. If the maximum input signal Xmax to the digital system is (1−2^(−M)), the output of the digital system is restricted to {y(n)}<1 provided that the scaling factor is limited by G<1/{Xmax*Sigma [mod Hk] for k ranging from 0 to N−1.} Where Hk is the impulse response of the filter with length N. The summation term Sigma [mod Hk] fork ranging from 0 to N−1 is called the L1 norm.

In scaling by the square root of sum of squared magnitude of impulse response (L2 norm), the scaling factors which can be used are as follows. G<1/{Xmax*Sqrt (Sigma [H(k)^2] for k ranging from 0 to N−1)}. The above norm is called the L2 norm and is always lesser than L1. In some embodiments, the Scaling by the sum of magnitude of impulse response (L1 norm), and Scaling by the square root of sum of squared magnitude of impulse response (L2 norm) methods are used for wideband signals.

In Scaling by a maximum of frequency response (Chebyshev norm), it is used to determine the scaling factor is applicable when the input is a narrowband signal. In this method, the magnitude response at the input frequency is first determined which is multiplied by the maximum input signal Xmax to determine the scaling gain as follows. G<1/{Xmax*max [H(wk)]}. The term max [H(wk)] is known as the Chebyshev norm of the frequency response H(w). This guarantees that the steady-state response of the system to a sine-wave input will never overflow.

The noise estimation is performed by collecting instantaneous noise statistics from OFDM carriers and averaging the noise statistics separately in several sub-groups. The noise statistics are subsequently averaged from multiple orthogonal frequency-division multiplexing (OFDM) symbols to enhance the noise power estimates. Based on these noise power estimates both color and variation of noise statistics are determined as a short term or a long-term estimate. The SNR estimation is determined using various estimators (For example Maximum Likelihood (ML) and Minimum Mean Square Estimate (MMSE) Estimators, Boumard's Estimator, or Ren's Estimator). The SNR estimators require Received Signal Y(n), Channel Estimate H(n), and pre-defined Pilot or Training signal strengths to be probed based on which Second-order Moments are computed. Alternate methods also make use of Preamble symbols which can be probed. In some embodiments, the SNR is determined for both frequency selective channels and non-selective channels. The delay spread estimation is determined using the channel frequency response and computing the correlation estimates over multiple symbols.

Figure 5:
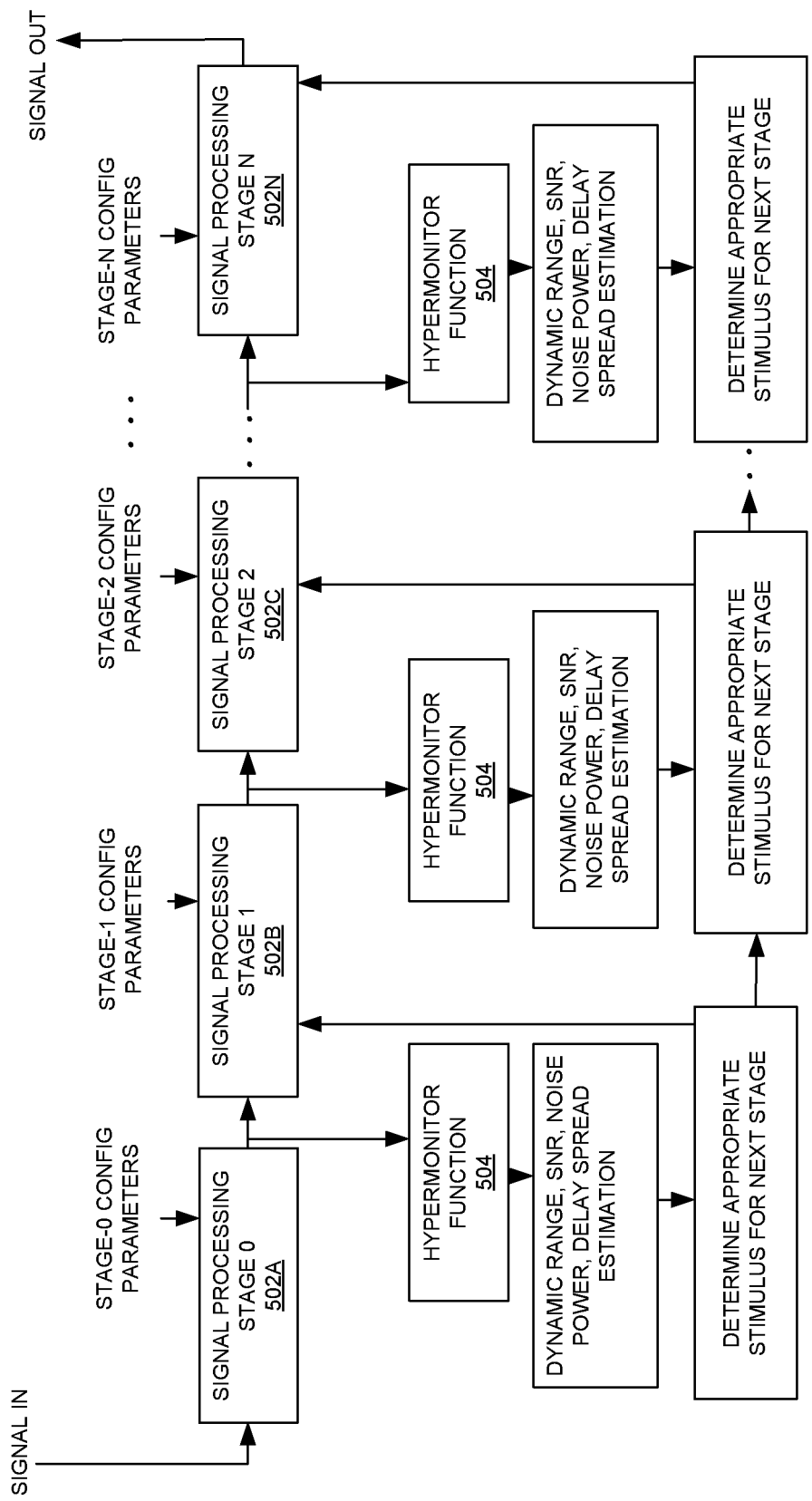
FIG. 5 illustrates an exemplary block diagram of a Hypermonitor function for bookkeeping and optimizing inputs for at least one of (i) a RAN Orchestrator or (ii) a RAN Hypervisor of FIG. 3B according to some embodiments herein.

FIG. 5 illustrates an exemplary block diagram of a Hypermonitor function 504 for bookkeeping and optimizing inputs for at least one of (i) the RAN Orchestrator 312 or (ii) the RAN Hypervisor 314 of FIG. 3B according to some embodiments herein. The Hypermonitor function 504 probes outputs of multiple signal processing stages 502A-N that are operating based on corresponding configuration parameters. The probed outputs are analyzed to estimate signal statistics pertaining to dynamic range, SNR, Noise power, delay spread, etc. to determine an appropriate stimulus for the next signal processing stage. In some embodiments, an output signal at an Nth signal processing stage is the final output.

Figure 6A:
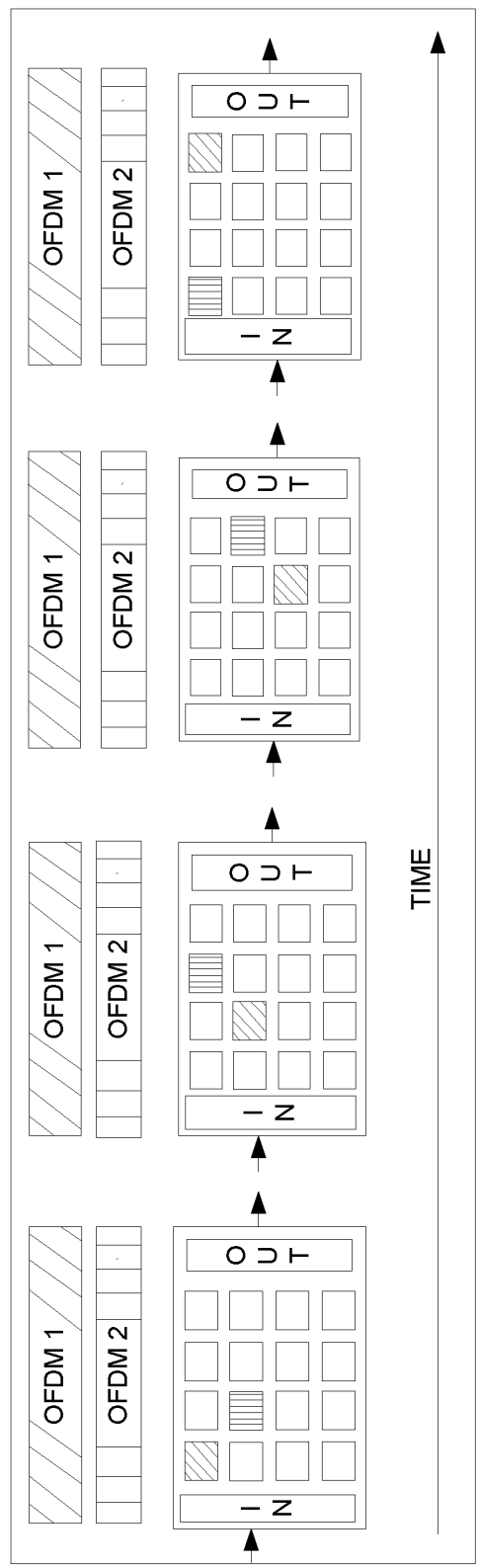
FIGS. 6A-6C are exemplary views that illustrate mapping signal chains to a RAN Hardware that includes processing elements (PE) in a typical COTS Processors such as Intel Xeon, Digital Signal Processor (e.g. from TI), or Field Programmable Gate Array (FPGA) environment according to some embodiments herein.
Figure 6B:
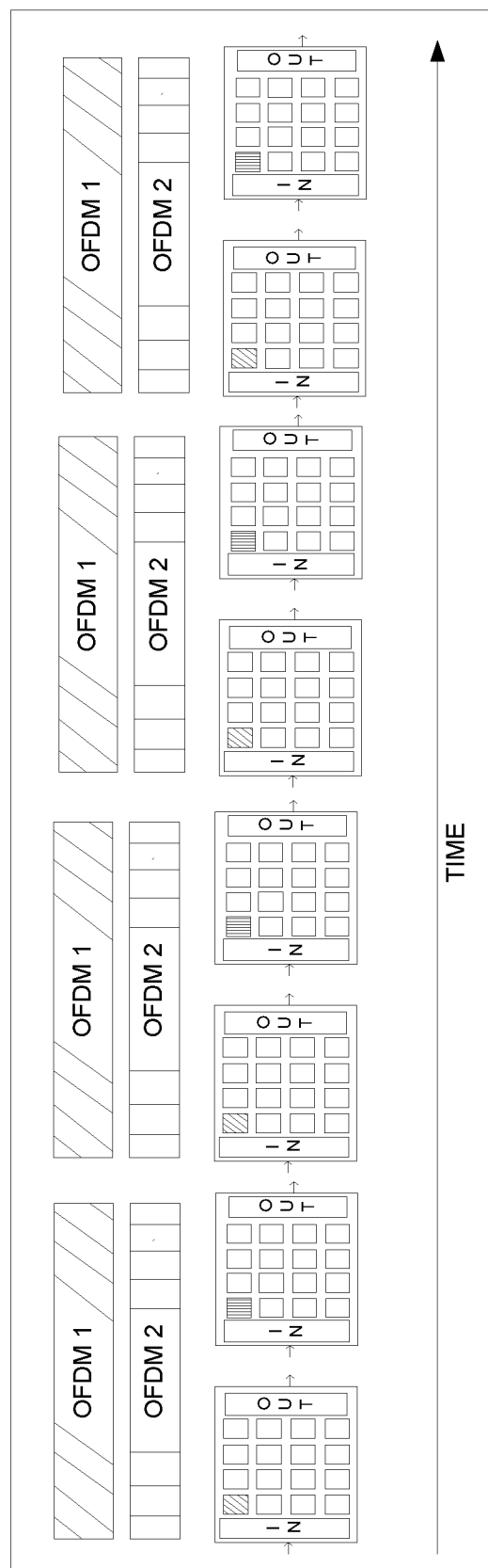
Figure 6C:
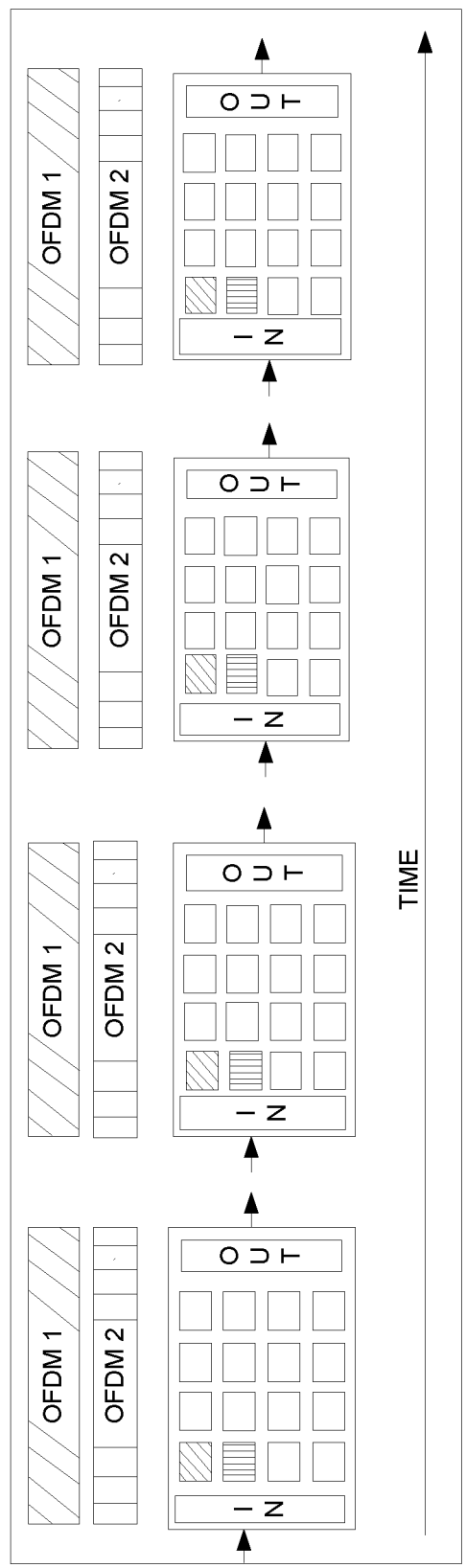

FIGS. 6A-6C are exemplary views that illustrate mapping signal chains to the RAN Hardware 326 that includes processing elements (PE) in a typical COTS Processor such as Intel Xeon, Digital Signal Processor (e.g. from TI) or Field Programmable Gate Array (FPGA) environment according to some embodiments herein. In some embodiments, schedulable resources for mapping the signal chains to the processing elements in the Digital Signal Processors or FPGA environment includes at least one of a tile of processors or a group of processors, memory hierarchy and latencies associated with each memory, DMAs and other 10 mechanisms that are shared and virtualized across the RAN modems and DSP functions. In some embodiments, the processing elements may use the schedulable resources spatially, or temporally or a combination of both. FIG. 6A is an example of the mapping of two OFDM streams into different tiles over time. In some embodiments, different streams are dynamically mapped to different tiles. Allocation to Processing Elements is performed at OFDM symbol boundaries or even at finer time resolution. FIG. 6B is an example of mapping of the processing elements in the same processing tile in a time-multiplexed manner within symbol time.

FIG. 6C is an example of different tasks that are statically mapped to different tiles. In some embodiments, the RAN Hypervisor 314 performs a spatial or a temporal mapping depending on a Network Slice execution. The RAN Hypervisor 314 understands attributes of memory latency and power consumption which may serve as additional cost functions in deciding the mapping of signal processing chain blocks to Processing Elements.

Figure 7:
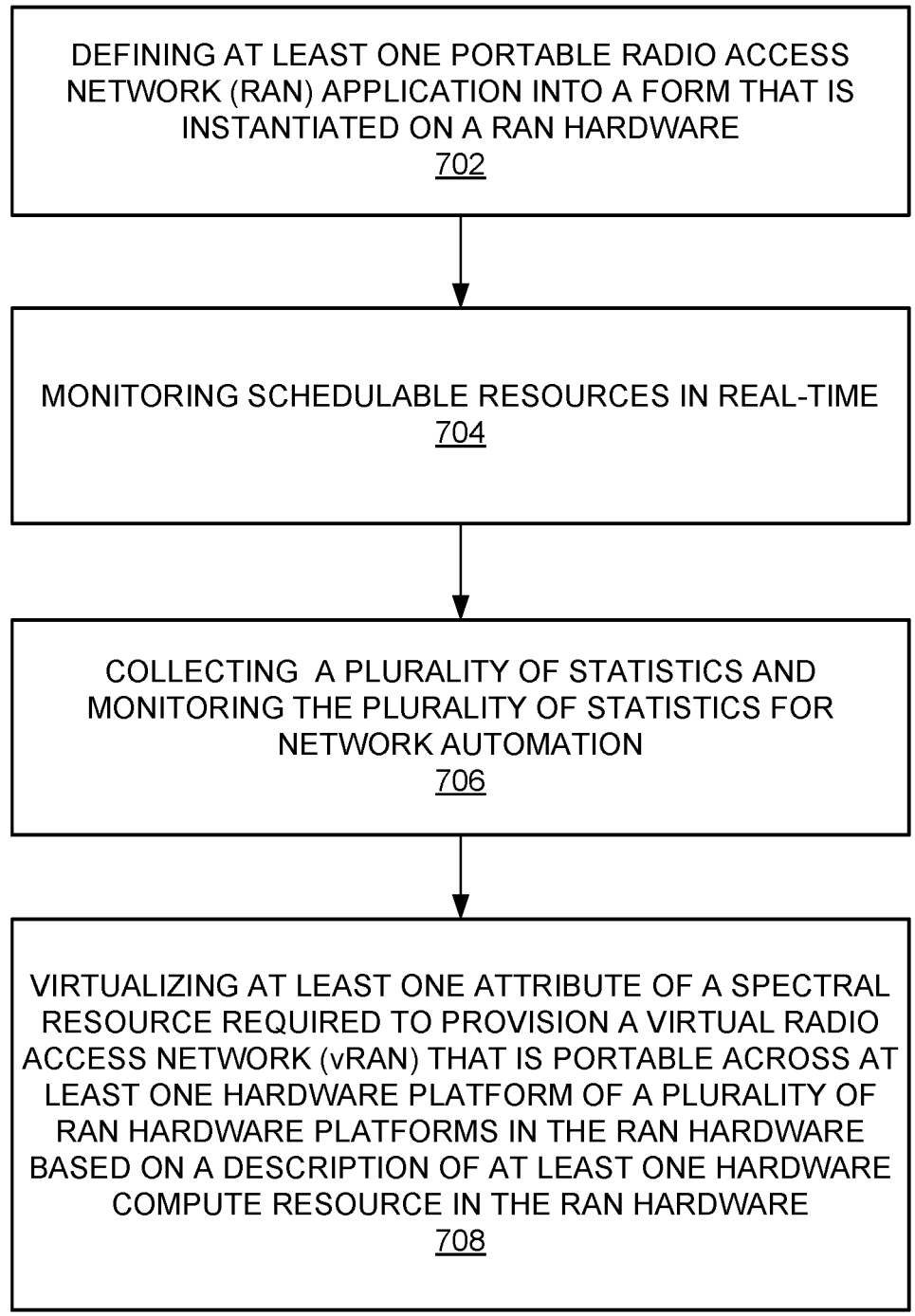
FIG. 7 is a flow diagram that illustrates a method of provisioning a virtual Radio Access Network (vRAN) that is portable across one or more RAN hardware platforms according to some embodiments herein.

FIG. 7 is a flow diagram that illustrates a method of provisioning a virtual Radio Access Network (RAN) that is portable across one or more RAN hardware platforms according to some embodiments herein. At step 702, at least one portable Radio Access Network (RAN) application is defined into a form that is instantiated on a RAN targeted hardware. At step 704, schedulable resources are monitored in real-time. At step 706, one or more statistics are collected and monitored for network automation. At step 708, at least one attribute of a spectral resource required to provision the virtual Radio Access Network (vRAN) that is portable across at least one hardware platform of the one or more RAN hardware platform is virtualized based on a description of at least one hardware compute resource in the RAN hardware 326.

In some embodiments, the method includes scheduling multiple RAN modem instance 306 of RAN flow-graphs to dynamically share RAN workload across Processing Elements (PE's) using the RAN hypervisor 314.

In some embodiments, the method includes allowing dynamic reconfiguration of the RAN hardware 326 based on RF and signal conditions using hyper observability.

In some embodiments, the method includes auto-learning based on past decisions and inputs from a hyper-monitor for utilization of the spectral resources 338.

In some embodiments, the method includes mapping each RAN modem instance 306 to an actual physical processing element across the RAN hardware 326 by (i) (i) analyzing a detailed description of computing, storage and interconnect resource elements in each RAN hardware 326, (ii) correlating the detailed description with a multitude of constraints that are provided by a runtime specification for the each modem instance 306 and (iii) creating a mapping of the RAN modem instance 306 across the processing elements of the underlying the RAN Hardware 326.

In some embodiments, the method includes (i) monitoring selectable hardware signals and providing an interface function to move out data at wire speeds to the hyper-monitor function for storage; (ii) interacting with the RAN hardware 326 and setting control signals to monitor a set of functionalities; and (iii) performing store and query of a database that is created by the hyper-monitor function. In some embodiments, a small inference engine that runs to determine the control signals. In some embodiments, filter signals are provided to reduce unnecessary data transfers. In some embodiments, inferences run on stored data for use in automation and a Radio Interface Controller (RIC).

The embodiments herein may include a computer program product configured to include a pre-configured set of instructions, which when performed, can result in actions as stated in conjunction with the methods described above. In an example, the pre-configured set of instructions can be stored on a tangible non-transitory computer-readable medium or a program storage device. In an example, the tangible non-transitory computer-readable medium can be configured to include the set of instructions, which when performed by a device, can cause the device to perform acts similar to the ones described here. Embodiments herein may also include tangible and/or non-transitory computer-readable storage media for carrying or having computer-executable instructions or data structures stored thereon.

Generally, program modules utilized herein include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

The embodiments herein can include both hardware and software elements. The embodiments that are implemented in software include but are not limited to, firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem, and Ethernet cards are just a few of the currently available types of network adapters.

A representative hardware environment for practicing the embodiments herein is depicted in FIG. 8, with reference to FIGS. 3A through 7. This schematic drawing illustrates a hardware configuration of the computing device 301 in accordance with the embodiments herein. The computing device 301 includes at least one processing device 10. The special-purpose CPUs 10 are interconnected via system bus 12 to various devices such as a random-access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The computing device 301 can read the inventive instructions on the program storage devices and follow these instructions to execute the methodology of the embodiments herein. The computing device 301 further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23, which provides a graphical user interface (GUI) 29 of the output data in accordance with the embodiments herein, or which may be embodied as an output device such as a monitor, printer, or transmitter, for example. Further, a transceiver 26, a signal comparator 27, and a signal converter 28 may be connected with the bus 12 for processing, transmission, receipt, comparison, and conversion of electric or electronic signals.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A virtual Radio Access Network (vRAN) system for provisioning a virtual Radio Access Network (vRAN) that is portable across a plurality of RAN hardware platforms, comprising:
    a waveform development kit that defines at least one portable Radio Access Network (RAN) application into a form that is instantiated on a RAN hardware; and
    a waveform execution environment that (i) monitors schedulable resources in real-time, and (ii) collects a plurality of statistics and monitors the plurality of statistics for network automation, wherein the waveform execution environment comprises:
    a RAN hypervisor that virtualizes at least one attribute of a spectral resource required to provision the virtual Radio Access Network (vRAN) that is portable across at least one hardware platform of the plurality of RAN hardware platforms in the RAN hardware based on a description of at least one hardware compute resource in the RAN hardware.

2. The virtual Radio Access Network (vRAN) system of claim 1, wherein the waveform development kit comprises
    a defined Domain Specific Language (DSL) that captures at least one domain-specific pattern for describing functions associated with the Radio Access Network (RAN); and
    a compiler that converts a Platform Independent (PI) signal processing algorithm that is described in the defined Domain Specific Language (DSL) to a byte code or an intermediate representation (IR) for execution on a RAN targeted hardware.

3. The virtual Radio Access Network (vRAN) system of claim 2, wherein the defined Domain Specific Language (DSL) comprises
    (i) a stream process function that operates on at least one of the incoming streams of frames, packets, symbols, or samples, wherein the stream process function (i) obtains a stream type and converts the stream type to another stream type or (ii) performs an operation on each element of a stream type; and
    (ii) a control process function that emits signals to indicate conditions at a time of processing the stream type, wherein the signals are consumed by at least one of (i) other control process functions or (ii) stream process functions to perform another action or alter a path of execution.

4. The virtual Radio Access Network (vRAN) system of claim 2, wherein the virtual Radio Access Network (vRAN) system comprises a RAN orchestrator that creates, deletes, or modifies the RAN modem instances of a plurality of radio virtual machine for RAN containers which execute on the RAN Hypervisor, wherein the RAN orchestrator instantiates and co-ordinates various modem entities created on the RAN hypervisor by understanding scheduling information and runtime specifications bundled along with each RAN modem instance.

5. The virtual Radio Access Network (vRAN) system of claim 4, wherein the virtual Radio Access Network (vRAN) system comprises a modem store which is a cache or a RAN modem instance of intermediate representations of different waveforms generated by the waveform development kit, wherein the intermediate representations are combined with a scheduling information and runtime specification derived from constraints on the at least one domain-specific pattern specified in the defined Domain Specific Language (DSL) model for execution on the RAN targeted hardware, wherein the intermediate representations are hosted on the modem store along with the scheduling information and the runtime specification.

6. The virtual Radio Access Network (vRAN) system of claim 5, wherein the modem store is connected with the RAN orchestrator to enable a provision of modems and resources required to execute the virtual Radio Access Network (RAN).

7. The virtual Radio Access Network (vRAN) system of claim 4, wherein each runtime specification is a configuration database that describes various runtime and code generation specific aspects that enable the RAN Hypervisor to appropriately map an intermediate representation (IR) of the RAN modem instance to the RAN hardware.

8. The virtual Radio Access Network (vRAN) system of claim 4, wherein the RAN hypervisor manages usage of computing elements on the RAN hardware, wherein security features provided by the RAN hardware and policies provided in the RAN orchestrator are used by the RAN hypervisor to manage the at least one attribute associated with the computing elements.

9. The virtual Radio Access Network (vRAN) system of claim 1, wherein the RAN hypervisor comprises
    a RAN compute hypervisor that provides a platform for Virtual Machines (VMs) on which a RAN modem instance is executed, and
    a RAN spectral hypervisor that virtualizes an RF hardware that is used for building Radio Units and modem independent RF attributes that are stored in a RF attribute database.

10. The virtual Radio Access Network (vRAN) system of claim 9, wherein the RAN spectral hypervisor uses Artificial Intelligence (AI) prediction engines on the RF attribute database and designs an RF attribute aware waveform for utilization of spectral resources.

11. The virtual Radio Access Network (vRAN) system of claim 9, wherein a mapper that maps each RAN modem instance to an actual physical processing element across the RAN hardware by (i) analyzing a detailed description of computing, storage and interconnect resource elements in each RAN hardware, (ii) correlating the detailed description with a multitude of constraints that are provided by a runtime specification for each modem instance and (iii) creating a mapping of the RAN modem instance across the processing elements of underlying the RAN Hardware, wherein the detailed description is provided in a Hardware Resource Description (HRD).

12. The virtual Radio Access Network (vRAN) system of claim 1, wherein the RAN hypervisor distributes and manages dynamic load associated with the virtual Radio Access Network (RAN) across processing elements (PE) by scheduling a multiple RAN modem instance of Radio Access Network (RAN) and Digital Signal Processing (DSP) flowgraphs on heterogeneous processing elements.

13. The virtual Radio Access Network (vRAN) system of claim 1, wherein the virtual Radio Access Network (vRAN) system slices a radio frequency channel and virtualizes in at least one of time domain, frequency domain or spatial domain to enable an implementation of slicing concept in 5G and other communication modems.

14. The virtual Radio Access Network (vRAN) system of claim 1, wherein multiple hierarchies of a hyper-monitor function include at least one of:
   a hardware function block that monitors selectable hardware signals and provides an interface function to move out data at wire speeds to the hyper-monitor function for storage;
   a low-level software function block interacts with the RAN hardware and sets control signals to monitor a set of functionalities, wherein the low-level software function block runs in a small inference engine to determine the control signals, wherein the low-level software function block provides filter signals to reduce unnecessary data transfers; and
   a software function that is located inside the RAN hypervisor to perform store and query a database that is created by the hyper-monitor function, wherein a software block runs inferences on stored data for use in automation and the Radio Interface Controller (RIC).

15. A method of provisioning a virtual Radio Access Network (vRAN) that is portable across a plurality of RAN hardware platforms, comprising:
   defining, by a waveform development kit, at least one portable Radio Access Network (RAN) application into a form that is instantiated on a RAN hardware;
   monitoring, by a waveform execution environment, schedulable resources in real-time;
   collecting, by the waveform execution environment, a plurality of statistics and monitoring the plurality of statistics for network automation; and
   virtualizing, using a RAN hypervisor, at least one attribute of a spectral resource required to provision the virtual Radio Access Network (vRAN) that is portable across at least one hardware platform of the plurality of RAN hardware platforms in the RAN hardware based on a description of at least one hardware compute resource in the RAN hardware.

16. The method of claim 15, wherein the method comprises scheduling multiple RAN modem instance of RAN flow-graphs to dynamically share RAN workload across Processing Elements (PE's) using the RAN hypervisor.

17. The method of claim 15, wherein the method comprises allowing dynamic reconfiguration of the RAN hardware based on RF and signal conditions using hyper observability.

18. The method of claim 15, wherein the method comprises auto-learning based on past decisions and inputs from a hyper-monitor for utilization of spectral resources.

19. The method of claim 15, wherein the method comprises mapping each RAN modem instance to an actual physical processing element across the RAN hardware by
   (i) analyzing a detailed description of computing, storage and interconnect resource elements in each RAN hardware;
   (ii) correlating the detailed description with a multitude of constraints that are provided by a runtime specification for each modem instance; and
   (iii) creating a mapping of the RAN modem instance across the processing elements of the underlying the RAN Hardware.

20. The method of claim 15, wherein the method comprises
   monitoring selectable hardware signals and providing an interface function to move out data at wire speeds to a hyper-monitor function for storage;
   interacting with the RAN hardware and setting control signals to monitor a set of functionalities, wherein a small inference engine that runs to determine the control signals, wherein filter signals are provided to reduce unnecessary data transfers; and
   performing store and query of a database that is created by the hyper-monitor function, wherein inferences run on stored data for use in automation and a Radio Interface Controller (RIC).

* * * * *